United States Patent
Zhang

(10) Patent No.: US 9,642,135 B2
(45) Date of Patent: May 2, 2017

(54) METHOD AND APPARATUS FOR MANAGEMENT OF PROTECTED RESOURCE IN A HETEROGENEOUS NETWORK

(71) Applicant: Avago Technologies General IP (Singapore) Pte. Ltd., Singapore (SG)

(72) Inventor: Lili Zhang, Beijing (CN)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/784,000

(22) PCT Filed: Apr. 15, 2013

(86) PCT No.: PCT/CN2013/074212
§ 371 (c)(1),
(2) Date: Oct. 12, 2015

(87) PCT Pub. No.: WO2014/169420
PCT Pub. Date: Oct. 23, 2014

(65) Prior Publication Data
US 2016/0066315 A1   Mar. 3, 2016

(51) Int. Cl.
*H04W 72/04* (2009.01)
*H04W 72/12* (2009.01)
*H04L 29/06* (2006.01)

(52) U.S. Cl.
CPC ... *H04W 72/0446* (2013.01); *H04W 72/1226* (2013.01); *H04L 63/08* (2013.01)

(58) Field of Classification Search
CPC .......... H04W 72/0446; H04W 72/1226; H04L 29/06; H04L 29/08; H04L 63/08;
(Continued)

(56) References Cited

U.S. PATENT DOCUMENTS

2003/0182235 A1* 9/2003 Wang ................. G07F 17/0014
                                                                705/51
2005/0036443 A1* 2/2005 Collins .................... G06F 8/60
                                                                370/216
(Continued)

FOREIGN PATENT DOCUMENTS

| CN | 102655681 | 9/2012 |
|---|---|---|
| WO | WO-2012/058623 | 5/2012 |
| WO | WO-2013/025405 | 2/2013 |

OTHER PUBLICATIONS

International Search Report for PCT/CN2013/074212 mailed Jan. 16, 2014.
(Continued)

*Primary Examiner* — Afsar M Qureshi
(74) *Attorney, Agent, or Firm* — Foley & Lardner LLP

(57) ABSTRACT

A method for a victim base station to manage almost blank subframe (ABS) resources in a heterogeneous network deployment is disclosed and the method comprises categorizing each of one or more protected ABS resources as one of a primary protected ABS resource and a secondary protected ABS resource, the one or more protected ABS resources allocated by a target aggressor base station and one or more neighbor aggressor base stations; classifying each of one or more associated UEs as a fully interfered UE or a partially interfered UE; and scheduling the one or more ABS resources for the one or more associated UEs based on the category of each categorized ABS resource and classified status of each associated UE.

20 Claims, 5 Drawing Sheets

(58) Field of Classification Search
CPC ......... H04L 63/10; H04L 63/20; G06F 21/00; G06F 15/16; G06F 9/46
USPC .................................................. 370/216, 329
See application file for complete search history.

(56) References Cited

U.S. PATENT DOCUMENTS

| | | | | |
|---|---|---|---|---|
| 2009/0037582 | A1* | 2/2009 | Morris | H04L 63/10 709/225 |
| 2011/0249642 | A1* | 10/2011 | Song | H04W 28/16 370/329 |
| 2012/0207123 | A1* | 8/2012 | Seo | H04L 1/1861 370/329 |
| 2014/0059560 | A1* | 2/2014 | Solihin | G06F 9/50 718/104 |
| 2014/0082706 | A1* | 3/2014 | Banford | H04L 67/145 726/5 |
| 2015/0023263 | A1* | 1/2015 | Son | H04W 72/082 370/329 |
| 2015/0289263 | A1* | 10/2015 | Ohta | H04W 16/04 370/329 |

OTHER PUBLICATIONS

Written Opinion for PCT/CN2013/074212 mailed Jan. 16, 2014.
International Preliminary Report of Patentability for PCT/CN2013/074212 mailed Oct. 20, 2015.

* cited by examiner

METHOD AND APPARATUS FOR MANAGEMENT OF PROTECTED RESOURCE IN A HETEROGENEOUS NETWORK

RELATED APPLICATIONS

This application is the U.S. National Stage of and claims priority to and the benefit of International Patent Application Number PCT/CN2013/074212, filed Apr. 15, 2013. The entire contents of the foregoing are hereby incorporated herein by reference for all purposes.

TECHNICAL FIELD

An example embodiment of the present invention relates generally to wireless communications, and, more particularly, to management of protected resources in a heterogeneous network.

BACKGROUND

Heterogeneous networks are becoming popular due to the rapid increase of numbers of mobile subscribers and demand for bandwidth, and the inadequacy of traditional macro base stations in meeting subscriber requirements. Homogenous networks consisting of solely traditional macro base stations may have blind spots in coverage that may adversely impact user experience. With the introduction of lower power base stations, including pico cells, femto cells, and relay nodes, newer generation of wireless network topology such as that of a LTE-A network becomes a heterogeneous network (HetNet) that is able to deliver more complete coverage and to support diverse types of wireless devices. In a HetNet as defined in 3GPP Release 10, low power nodes (LPNs), such as Remote Radio Unit/Remote Radio Head (RRU/RRH), pico eNB (Enhanced Node B), home eNB, and relay node, are deployed inside the macro base station or enhanced node B coverage cell.

The LTE technology is adapted for a smooth evolution from earlier 3GPP systems. In a LTE networking environment, technologies such as inter-cell interference coordination (ICIC) in the frequency domain and enhanced ICIC (eICIC) in the time domain have been developed for a new heterogeneous network topology in LTE-Advanced (LTE-A) technology. In a heterogeneous network deployment, combined usage of eICIC and cell range expansion (CRE) can be effective means for improving the system and cell-edge throughput. With eICIC, a macro cell may utilize almost blank subframes (ABS) with zero transmission power mainly in Physical Downlink Control Channel/Physical Downlink Shared Channel (PDCCH/PDSCH) to mitigate the interference to pico user equipments (UEs) with Cell Range Expansion (CRE). Furthermore, a resource status mechanism may enable a pico eNB to provide information in order to help the macro eNB evaluate the need for modification of the ABS pattern. To this end, a macro eNB may determine the ABS pattern adjustment based on downlink (DL) ABS status information.

The concept of an Almost Blank Subframe (ABS) was introduced in eICIC to address control channel interference between a macro eNB and a smaller base station such as a pico eNB in the time domain. Almost blank subframes are transmitted at low power and only contain limited signals. The interfering base station is configured to include ABSs in its transmission so that the ABS may be used by the interfered cell to provide service for a UE that previously experienced strong interference. By coordinating the transmissions of the macro eNB and the pico eNB using ABS, inter-cell interference is minimized or avoided. An aggressor eNB is an interfering eNB and a victim eNB is an interfered eNB.

In a HetNet deployment with small cells, it is likely that the traffic may be fluctuating, since the number of users per small cell node is typically not very large due to small coverage. In a small-cell coverage, it is likely that the user distribution is also very fluctuating and dynamic between the small cell nodes. Allowing for asymmetric uplink (UL)-downlink (DL) allocations has been claimed as one of the benefits of using TDD system. The asymmetric resource allocation in LTE TDD is realized by providing seven different semi-statically configured uplink-downlink configurations. These allocations may provide between 40% and 90% DL subframes. In current LTE deployment, same TDD configuration in each cell may be assumed, because otherwise interference between UL and DL including both base station-to-base station and UE-to-UE interference needs to be considered. However, in local area (LA) network, due to small number of active UEs per cell, the traffic situation may fluctuate frequently, and TDD reconfiguration to adapt to the traffic may provide improved resource efficiency and power saving. Some recent small cell enhancement proposals further point out it is of practical use that coordination between small cells and between small cell and macro cell is necessary to provide sufficient robustness of joint transmissions, efficient resource allocation and etc.

Enabling of the flexible TDD configuration due to the traffic fluctuation may cause more variable DL transmissions at a small cell depending on the traffic situation. This hence may require the relatively frequent increase/decrease of protected resource at a macro eNB. However, for a small cell, located in the overlapped area of two or more different aggressor cells, it may be difficult to coordinate the ABS allocation between these aggressor cells. Especially the assumption/limitation that only the common available ABS from the different aggressor cells should be adopted, may cause a small cell victim UEs (edge UE in the CRE range) to suffer from the severe resource restriction, in respect to the variable DL transmission due to the flexible TDD configuration. It in turn further results in the aggravation of the frequent increase/reduction of protected resource at macro eNB to meet its request.

Some current time domain eICIC solution standardized for HetNet is subject to limitations concerning the possibility to coordinate ABS allocation across different aggressor eNBs. Hence a simple and feasible solution is needed to allow an eNB to adapt the allocated ABS pattern in a way to not only match other aggressor eNB patterns but also minimise resource wastage caused by the currently specified unusable ABSs. It may also facilitate the reduction of unnecessary frequent adjustment of protected resource for meeting the resource request in such case.

In current eICIC, it is possible that multiple aggressor cells allocate ABS patterns or ABS resource to victim cells. However, it is possible that the victim cell is unable to use the ABS subframes allocated by the aggressor cell, due to high interference caused by other aggressors that have not allocated the same ABS pattern. In another word, when there are multiple interfering macro cells to one pico cell, pico cell may receive multiple ABS patterns from these associated macro cells. Since it is possible that there is no/few common subsets among those ABS patterns transmitted from neighboring macro cells to the pico cell, there is consequently no/few usable ABS resource for the pico UEs in the CRE area of this specific pico cell for data transmission.

With the number of densely distributed small cells increasing, many unusable ABS may be created due to poor ABS coordination among aggressor cells. In addition to the usable ABS resource, other resource may also be used to reduce the resource waste in some specific situations. For example, when a pico cell with a large CRE bias is unevenly located in the overlapped area of two aggressor macro cells, the victim UE in the CRE region of pico (located in the major aggressor cell, but far away from the other aggressor cell) may use the ABS allocated by the major aggressor cell rather than the other secondary aggressor cells. Sometimes the assumption may be relaxed that only the commonly available ABS can be the usable ABS. For example the assumption may be less strict when a first priority ABS, and a second priority ABS are differentiated. The ensuing resource status feedback and measurement subset impact may be considered. Via such a modified Usable primary ABS Pattern Info and secondary ABS pattern Info IE, an aggressor eNB may be able to understand which ABS subframes are actually adequately used by the victim cell, independently of the aggressor cell. Hence it may provide the aggressor cell a full view of the allocated protected resource utilization. In this way, the macro eNB may rearrange its ABS patterns in a way that may better match the patterns of other aggressor nodes and satisfy the small cell requirement for the protected resource and therefore minimise both macro and pico resource wastage.

In contrast, if the ABS is adjusted solely based on the resource status of the primary usable ABS, it may be unfair from the whole system point of view, especially when the pico cell with fluctuating traffic is unevenly located in the overlapped area of two aggressor macro cells. To ensure an eNB to adapt the allocated ABS resources in a way to not only match other aggressor eNB resources but also minimise resource wastage caused by the currently specified unusable ABSs, a scheme is desired that allows the macro cell to consider both primary and secondary ABS statuses in deciding whether or not the protected resource allocation may be adjusted.

Following abbreviations are used in this application.
ABS almost blank subframe
AIL Acceptable Interference Level
BS Base Station
CPICH Common Pilot Channel
CRE Cell Range Expansion
DL Downlink
DPCCH Dedicated Physical Control Channel
E-DCH Enhanced Data Channel
ECNO Received Energy Per Chip/Power density in Band
EUTRAN Enhanced UTRAN
eICIC Enhanced Inter-Cell Interference Coordination
eNB Enhanced Node B.
FDD Frequency Division Duplex
HS-DPCCH High Speed-Dedicated Physical Control Channel
LAS LP-ABS status
LP-ABS Low Power Almost Blank Subframe
LTE Long Term Evolution
OAM Operation, Administration and Maintainence
PDCCH Physical Downlink Control Channel
PDSCH Physical Downlink Shared Channel
PRB Physical Resource Block
RCC Radio Resource Control
RLC Radio Link Control
RNTP Relative Narrowband Tx Power
RRC Radio Resource Control
RSRP Reference Signal Receiving Power
RSRQ Reference Signal Received Quality
RRU/RRH Remote Radio Unit/Remode Radio Head
Rx Receive
TDD Time Division Duplex
Tx Transmit
UE User Equipment
UMTS Universal Mobile Telecommunications System
UTRAN UMTS Radio Access Network
WCDMA Wideband Code Division Multiple Access
ZP-ABS Zero Power Almost Blank Subframe

SUMMARY

Various aspects of the invention are set out in the claims.

In accordance with an example embodiment of the present invention, a method for a victim base station to manage almost blank subframe (ABS) resources in a heterogeneous network deployment, comprises categorizing each of one or more protected ABS resources as one of a primary protected ABS resource and a secondary protected ABS resource, the one or more protected ABS resources allocated by a target aggressor base station and one or more neighbor aggressor base stations; classifying each of one or more associated UEs as a fully interfered UE or a partially interfered UE; and scheduling the one or more ABS resources for the one or more associated UEs based on the category of each categorized ABS resource and classified status of each associated UE.

In accordance with an example embodiment of the present invention, an apparatus for use in a victim base station to manage almost blank subframe (ABS) resources in a heterogeneous network deployment, comprises a processing system configured to categorize each of one or more protected ABS resources as one of a primary protected ABS resource and a secondary protected ABS resource, the one or more protected ABS resources allocated by a target aggressor base station and one or more neighbor aggressor base stations; classify each of one or more associated UEs as a fully interfered UE or a partially interfered UE; and schedule the one or more ABS resources for the one or more associated UEs based on the category of each categorized ABS resource and classified status of each associated UE.

In accordance with another example embodiment of the present invention, a computer program product comprises a computer-readable medium comprising a set of instructions, which, when executed by a victim base station, causes the base station to perform the steps of categorizing each of one or more protected ABS resources as one of a primary protected ABS resource and a secondary protected ABS resource, the one or more protected ABS resources allocated by a target aggressor base station and one or more neighbor aggressor base stations; classifying each of one or more associated UEs as a fully interfered UE or a partially interfered UE; and scheduling the one or more ABS resources for the one or more associated UEs based on the category of each categorized ABS resource and classified status of each associated UE.

In accordance with another example embodiment of the present invention, a method for an aggressor base station to manage almost blank subframe (ABS) resources in a heterogeneous network deployment, comprises receiving utilization statuses of one or more protected ABS resources from a victim base station and a ABS resource allocation for each of one or more neighbor aggressor base stations; categorizing each of the one or more protected Almost Blank Subframe (ABS) resources as a primary protected ABS resource and a secondary protected ABS resource; and determining an adjustment to an allocation of the one or more protected ABS resources based on the received utilization statuses, the categorized primary ABS resource and the categorized secondary ABS resource and the received ABS resource allocation of each of the one or more neighbor aggressor base stations.

In accordance with another example embodiment of the present invention, an apparatus for use in an aggressor base station to manage almost blank subframe (ABS) resources in a heterogeneous network deployment, comprises a processing system configured to receive utilization statuses of one or more protected ABS resources from a victim base station and a ABS resource allocation for each of one or more neighbor aggressor base stations; categorize each of the one or more protected Almost Blank Subframe (ABS) resources as a primary protected ABS resource and a secondary protected ABS resource; and determine an adjustment to an allocation of the one or more protected ABS resources based on the received utilization statuses, the categorized primary ABS resource and the categorized secondary ABS resource and the received ABS resource allocation of each of the one or more neighbor aggressor base stations.

BRIEF DESCRIPTION OF DRAWINGS

For a more complete understanding of example embodiments of the present invention, reference is now made to the following descriptions taken in connection with the accompanying drawings in which.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received and/or stored in accordance with embodiments of the present invention. As used herein, the terms "active cell," and "serving cell" may be used in alternative to each other to refer to a cell to which an UE is connected via a wireless connection. Likewise, as used herein, the terms "base station," "active eNB" and "serving eNB" may be used interchangeably to refer to either a base station of a cellular network alone or a combination of a radio network controller (RNC) and a base station of a cellular network, depending on a specific wireless network context. Also the term base station is used in a generic sense and it may be used interchangeably with the terms "cell," and the term "aggressor base station" or "victim base station" used interchangeably with the term "aggressor cell" or "victim cell." Also as used herein, the term "ABS pattern," and "ABS resource" and similar terms, as used in a general context, may be used interchangeably to refer to absolute blank frames. Thus, use of any such terms should not be taken to limit the spirit and scope of embodiments of the present invention.

Figure 1:
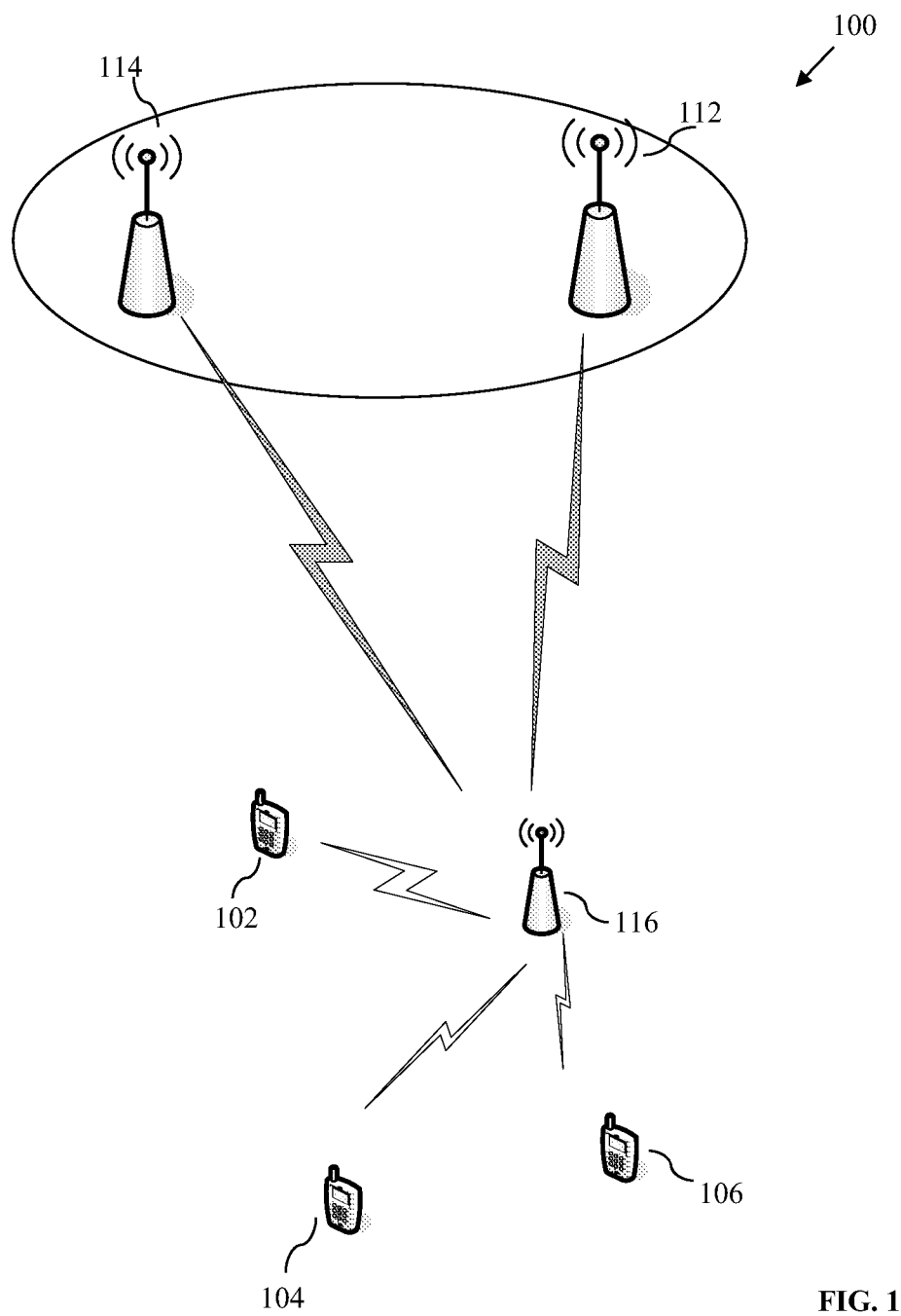
FIG. 1 illustrates an example wireless system in accordance with an example embodiment of the invention.

Referring now to FIG. 1, an example wireless network 100 is provided in accordance with an example embodiment of the invention. The wireless network 100 includes a pico base station 116, and a first macro base station 114, and a second macro base station 116. Associated with the pico base station 116 is a set of UEs including the UE 102, UE 104 and UE 106. In one example embodiment, the pico base station 116 receives an absolute blank subframe (ABS) resource allocations from the target macro base station 112 as well as the other macro base station 114. The macro base station 112 is a target base station for the pico cell base station 116 because the pico cell station 116 receives its ABS resource allocations from the macro base station 112 and reports the resource utilization status to the target base station 112. Because the pico cell base station 116 is interfered by both the macro cell base stations 112 and 114, the macro cell base stations are aggressor base stations for the victim pico cell base station 116.

In one example embodiment, the target macro base station eNB 112 either sends an initial ABS resource allocation upon system startup and an adjusted ABS resource allocation during normal operations, as triggered by an event or on a periodic basis. The pico cell base station 116 may first categorize each allocated ABS resource as a primary ABS resource if the ABS resource is common among all aggressor base stations 112 and 114. Otherwise, it is categorized as a secondary ABS resource. The pico cell base station 116 may then classify each of the associated UEs 102, 104 and 106 according to the degree of interferences it receives. For example, if the UE 102 is interfered by all aggressor macro base stations 112 and 114, it is classified as a fully interfered UE. Otherwise, because UEs 104 and 106 are only interfered by the aggressor macro base station 112, they are classified as partially interfered UEs. The pico cell base station 116 may then schedule resource based on the categorized ABS resources and the UE classification. In one example embodiment, the pico base station 116 may first schedule all primary ABS resources to the fully interfered UE 102 and once all primary ABS resources have been exhausted, then it may schedule the secondary ABS resources. In one example embodiment, the pico base station 116 reports back to the macro base stations 112 and 114 the utilization status of primary ABS resources and secondary ABS resources. Piggybacked on the ABS resource utilization status report message to the macro base station 112 is also the recommended ABS resource allocation by the other aggressor base station 114. On a periodic basis, the pico base station 116, as directed by the macro base station 112 or 114, may take measurements based on a measure set or measure set update received from the target base station 112.

In one example embodiment, the macro base station 112 may make a decision on whether to adjust the ABS resource allocation, based on the ABS resource utilization status information received from the pico base station 116 and on the recommended ABS resource allocation of other aggressor base station 114. One rule that the macro base station 112 may use is to first exhaust the available ABS resource common among all aggressor cells, and then use the ABS resource that are only shared by one of, not both of the aggressor base stations 112 and 114. The macro base station 112 may also adjust the transmission power level of these subframes by setting a power level for each ABS subframe according to the relative distance of the pico base station 1116 to the macro base station 112 as well as a CRE bias. The aggressor macro base station 112 may also update a measurement subset correspondingly and send the adjusted ABS resource allocation and the measurement set update to the pico base station 116 on a downlink signalling channel. In one example embodiment, the macro base stations 112 and 114 are LTE eNB and victim base station is a pico cell base station or a WiFi access point.

Figure 2:
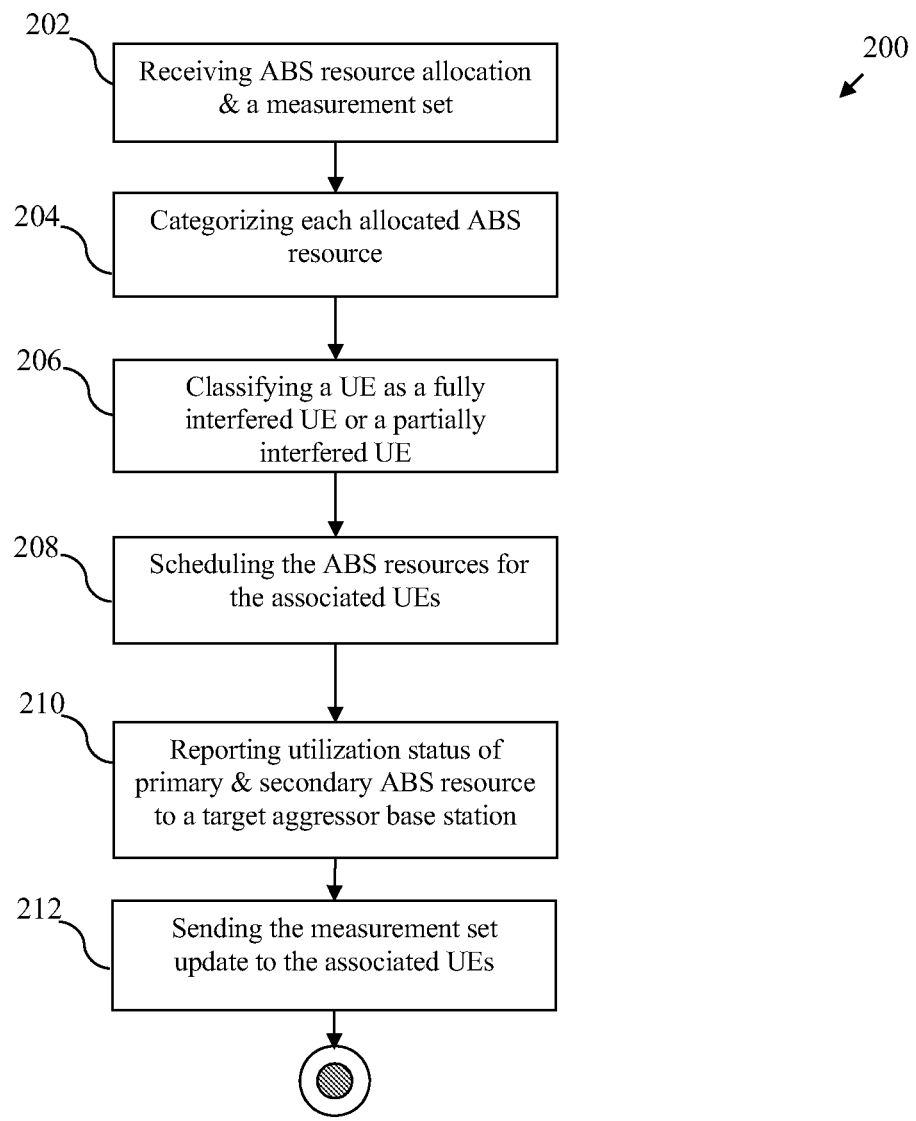
FIG. 2 illustrates an example method for a pico cell base station to manage protected resource in accordance with an example embodiment of the invention.

FIG. 2 illustrates an example method 200 for pico base station to manage ABS resources in accordance with an example embodiment of the invention. The method 200 may include receiving ABS resource allocation and measurement set at step 202, categorizing each allocated ABS resource at step 204, classifying each associated UE as a fully interfered UE or a partially interfered UE at step 206 and scheduling the ABS resources at step 208. The method 200 may also include reporting ABS resource utilization status at step 210, and sending the measurement set update to the associated UE at step 212.

In one example embodiment, receiving ABS resource allocation at step 202 may include receiving the ABS resource allocations such as one or more ABS patterns at pico cell base station via an inter-base station (e.g. inter-eNB) interface such as X2 or over the air (OTA) message exchange in a HetNet deployment, from a macro cell base station such as a macro base station 112 of FIG. 1. The received ABS resources are the subframes with zero transmission power mainly on PDCCH/PDSCH to mitigate the interference. The pico cell base station may also receive a measurement set from the macro base station either at the same time when it receives ABS resource allocations or at a different time through a different message. The measurement set may include applied subframes from which measurements shall be collected and an indication of how frequently the measurements are collected.

In one example embodiment, categorizing each allocated ABS resource at step 204 may include categorizing the ABS resource as a primary ABS resource if the ABS resource is common to all of the aggressor cells and as a secondary ABS resource if the ABS resource is common to some, but not all of the aggressor cells. A fully protected ABS resource is an ABS pattern where transmission powers of its subframes are zeroed out to minimize the interferences. The primary ABS resource is a currently usable, fully protected ABS resource allocated by all aggressor cells and the secondary ABS resource is a fully protected resource allocated by some, but not all aggressor cells. In one example embodiment, categorizing each allocated ABS resource may also include creating a utilization status for each primary ABS resource and secondary ABS resource. The primary ABS resource utilization status may represent a PRB utilization ratio for the highly interfered UE in the overlapped ABS allocation by two different aggressor cells or the usable ABS resource in the specification. The secondary ABS resource utilization status may represent a PRB utilization ratio for the highly interfered UE in the ABS resource allocated by one major aggressor cell rather than the other aggressor cell.

In one example embodiment, classifying a UE at step 206 may include classifying each of the UEs associated with the victim base station within its CRE as either a fully interfered UE or a partially interfered UE according to an interference level from the aggressor cells. The information on the interference level may be derived from a RSRP/RSRQ report and resource schedule information that the victim base station received from the target aggressor base station. In one example embodiment, classifying the UE may include classifying the UE as a fully interfered UE if the UE is interfered by all of the aggressor cells and classifying the UE as a partially interfered UE if the UE is interfered by some, but not all of the aggressor cells. Based on the RSRP/RSRQ report received from each associated UE, the victim pico eNB may determine which cell the main aggressor cell is and which associated UE is in the CRE area of the main aggressor cell.

In one example embodiment, scheduling the ABS at step 208 may include allocating each of the primary ABS resources first to the fully interfered UEs and allocating the secondary ABS resources to the partially interfered UEs after exhausting all the primary ABS resources. The victim cell such as a pico eNB may determine a usable secondary ABS resource according to the ABS resources allocated from the target aggressor cells after exhausting the ABS resources allocated from the other aggressor cells.

In one example embodiment, reporting utilization status at step 210 may include using an ABS Status IE to send the utilization statuses to the main target base station such as a LTE eNB to aid the eNB in evaluating the need for an adjustment of ABS resource allocation. The pico eNB may include a $6^{th}$ bit in the ABS Status IE of a status request message of an inter-eNB interface such as X2 application protocol to indicate the primary ABS resource utilization status and a $7^{th}$ bit in the IE of the status request message to indicate the secondary ABS resource utilization status. Table 1 below illustrates one example implementation of the ABS Status IE and it is meant for an illustration only.

TABLE 1

An example implementation of ABS Status IE

| IE/Group Name | Mandatory/ Optional | IE type and reference | Semantics description |
| --- | --- | --- | --- |
| DL ABS status | M | INTEGER (0 . . . 100) | Percentage of resource blocks of ABS allocated for UEs protected by ABS from inter-cell interference. This includes resource blocks of ABS unusable due to other reasons. The denominator of the percentage calculation is indicated in the Usable ABS Information. |

TABLE 1-continued

An example implementation of ABS Status IE

| IE/Group Name | Mandatory/ Optional | IE type and reference | Semantics description |
| --- | --- | --- | --- |
| DL primary ABS status | M | INTEGER (0 . . . 100) | Percentage of resource blocks of ABS allocated for UEs protected by primary ABS from inter-cell interference. The denominator of the percentage calculation is indicated in the Usable primary ABS Information. |
| DL secondary ABS status | M | INTEGER (0 . . . 100) | Percentage of resource blocks of ABS allocated for UEs protected by secondary ABS from inter-cell interference. The denominator of the percentage calculation is indicated in the Usable secondary ABS Information. |
| CHOICE Usable ABS Information | M | — | — |
| >FDD | | — | — |
| >>Usable primary ABS Pattern Info | M | BIT STRING (SIZE(40)) | Each position in the bitmap represents a subframe, for which value "1" indicates 'primary ABS that has been designated as protected from inter-cell interference' and value "0" indicates 'ABS that is not usable as primary protected ABS from inter-cell interference'. The pattern represented by the bitmap is a subset of, or the same as, the corresponding ABS Pattern Info IE conveyed in the LOAD INDICATION message. |
| >>Usable secondary ABS Pattern Info | M | BIT STRING (SIZE(40)) | Each position in the bitmap represents a subframe, for which value "1" indicates 'secondary ABS that has been designated as protected from inter-cell interference' and value "0" indicates 'ABS that is not usable as protected secondary ABS from inter-cell interference'. The pattern represented by the bitmap is a subset of, or the same as, the corresponding ABS Pattern Info IE conveyed in the LOAD INDICATION message. |
| >>Suggested ABS pattern | O | BIT STRING (SIZE(40)) | Each position in the bitmap represents a subframe, for which value "1" indicates 'suggested ABS that has been designated as protected from inter-cell interference' by the other aggressor cells and value "0" indicates a 'unsuggested ABS that is not preferred as protected from inter-cell interference'. The pattern represented by the bitmap is a subset of, or the same as, the corresponding ABS Pattern Info IE conveyed in the LOAD INDICATION message from the other aggressor cells. |
| >TDD | | — | — |
| >>Usable primary ABS Pattern Info | M | BIT STRING (1 . . . 70) | Each position in the bitmap represents a subframe, for which value "1" indicates 'ABS that has been designated as protected from inter-cell interference' and value "0" indicates 'ABS that is not usable as protected ABS from inter-cell interference'. The pattern represented by the bitmap is a subset of, or the same as, the corresponding ABS Pattern Info IE conveyed in the LOAD INDICATION message. |

TABLE 1-continued

An example implementation of ABS Status IE

| IE/Group Name | Mandatory/ Optional | IE type and reference | Semantics description |
|---|---|---|---|
| >>Usable secondary ABS Pattern Info | M | BIT STRING (1 . . . 70) | Each position in the bitmap represents a subframe, for which value "1" indicates 'secondary ABS that has been designated as protected from inter-cell interference' and value "0" indicates 'ABS that is not usable as protected secondary ABS from inter-cell interference'. The pattern represented by the bitmap is a subset of, or the same as, the corresponding ABS Pattern Info IE conveyed in the LOAD INDICATION message. |
| >>Suggested ABS pattern | O | BIT STRING (SIZE(70)) | Each position in the bitmap represents a subframe, for which value "1" indicates 'suggested ABS that has been designated as protected from inter-cell interference' by the other aggressor cells and value "0" indicates 'unsuggested ABS that is not preferred as protected from inter-cell interference'. The pattern represented by the bitmap is a subset of, or the same as, the corresponding ABS Pattern Info IE conveyed in the LOAD INDICATION message from the other aggressor cells. |

In one example embodiment, the ABS status IE as illustrated in Table 1, may include fields such as a downlink primary ABS status and a DL secondary ABS status. The ABS status IE may be used to support either TDD or FDD and thus may include a usable primary ABS pattern or resource info, usable secondary ABS pattern info, and suggested ABS pattern info for either FDD or TDD. Each field of ABS status IE may be a bit string (bitmap) or an integer and has a predefined definition. For example, the suggested ABS pattern field may be a bit string of length 70 bits, with each bit in the bitmap representing a subframe. Each value "1" indicates 'suggested ABS that has been designated as protected from inter-cell interference' by the other aggressor cells and a value "0" indicates 'un-suggested ABS that is not preferred as protected from inter-cell interference'. The pattern represented by the bitmap is a subset of, or the same as, the corresponding ABS Pattern Info IE conveyed in a LOAD INDICATION message from the other aggressor cells.

Reporting the utilization status of the primary & secondary ABS resources to the target aggressor eNB by a pico eNB may be triggered by a set of events or on a periodic basis. The triggering events may include utilization ratio of the primary ABS resource crossing a high threshold or a low threshold and a utilization ratio of the secondary ABS resource crossing a high threshold or a low threshold. In an example embodiment, the high threshold of the ABS resource utilization ratio may be between 70-80% and the low threshold of the utilization ratio between 20-30%.

In one example embodiment, reporting utilization status at step 210 may include piggybacking a recommended ABS resource allocation that are from other aggressor cells. The victim eNB may directly receive the ABS resource allocation from the other aggressor cells. Alternatively, the victim eNB may formulate a recommended resource allocations based on utilization status of the primary ABS resources and secondary ABS resources by the UEs associated with the victim eNB and available ABS resources from the other aggressor cells.

In one example embodiment, sending the measurement set update to the associated UE at step 212 may include sending the measurement set update to the associated UEs on a downlink signaling channel on a periodical basis or as directed by the target eNB. The target eNB may make an adjustment to the measurement set on a periodic basis or as triggered by the received ABS primary and secondary resource utilization statuses. The associated UEs may then use the measurement set update to take measurements of data and signaling channels, and report back the measurement results.

In one example embodiment, the process of categorizing the ABS resources, classifying the associated UE, scheduling the ABS resources, and reporting to the target eNB ABS resource utilization status may be repeated at a regular interval or as triggered by one or more events. The triggering event may include utilization ratio of the primary ABS resource crossing a high threshold or a low threshold, a utilization ratio of the secondary ABS resource crossing a high threshold or a low threshold and a utilization ratio of overall ABS resources crossing a high or low threshold.

In one example embodiment, the method 200 may be implemented at the pico base station 116 of FIG. 1. The method 200 is for illustration only and the steps of the method 200 may be combined, divided, or executed in a different order than illustrated, without departing from the scope of the invention of this example embodiment.

Figure 3:
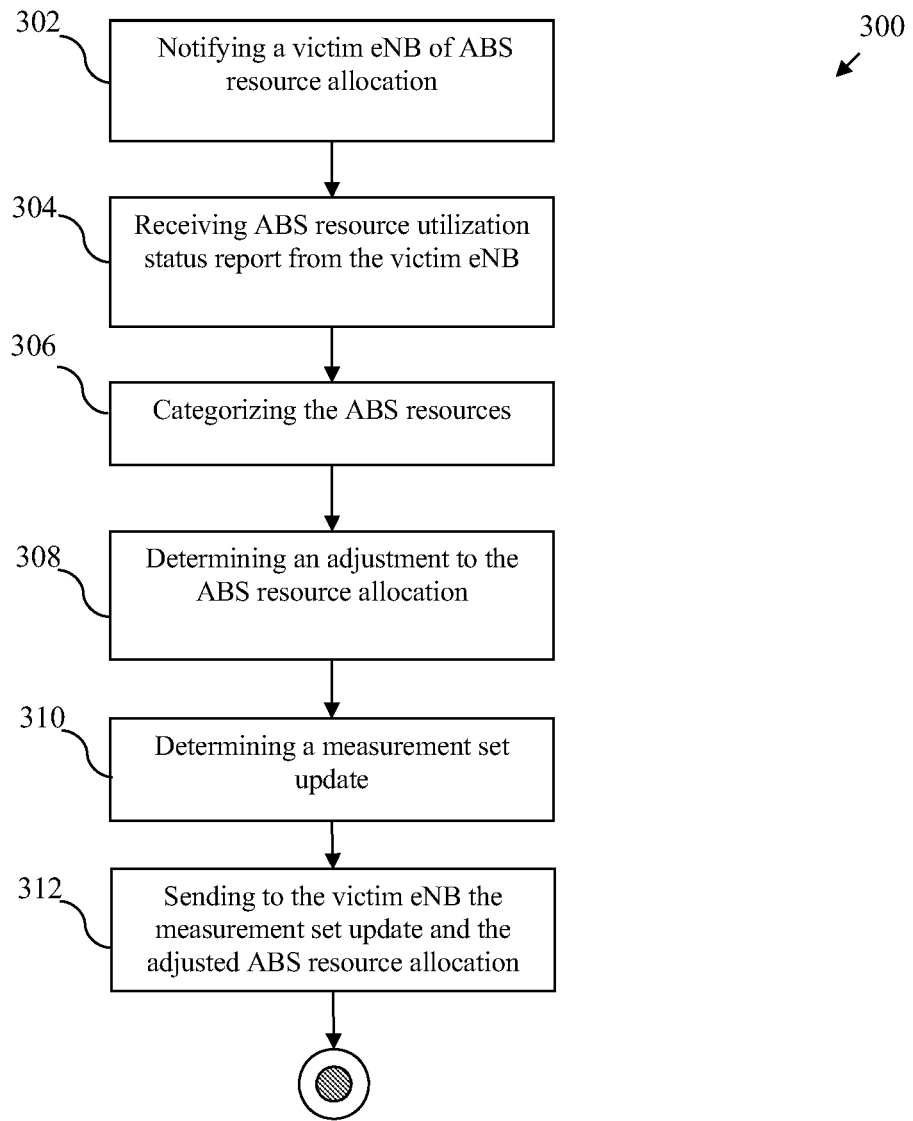
FIG. 3 illustrates an example method for macro base station to manage protected resource in accordance with an example embodiment of the invention.

FIG. 3 illustrates an example method 300 for a macro base station to manage protected ABS resource in accordance with an example embodiment of the invention. The method 300 may include notifying a victim eNB of ABS resource allocation at step 302, receiving ABS resource utilization status report from the victim eNB at step 304, and categorizing an ABS resource at step 306. The method 300 may also include determining an adjustment to the ABS resource allocation at step 308, determining a measurement set update at step 310 and sending to the victim eNB the measurement set update and the adjusted ABS resource allocation at step 312.

In one example embodiment, notifying a victim eNB of ABS resource allocation at step 302 may include sending an ABS resource allocation to the victim eNB via inter-eNB interface (e.g., X2, X3 or OTA interface). The ABS resource allocation may be an initial allocation or an update to a previous allocation. In case of an update to a previous allocation, the ABS resource allocation sent to the victim eNB may include at least one of an updated usable primary ABS resource in a bit stream, an updated unusable primary ABS resources, usable secondary ABS resource and an unusable secondary ABS resource.

In one example embodiment, receiving ABS resource utilization status report from the victim eNB at step 304 may include receiving the primary ABS resource utilization status and secondary ABS resource utilization status in an ABS Status IE included in a status request response signaling message. In one example embodiment, the primary ABS resource status may be included in a $6^{th}$ bit of the ABS status IE in and the secondary ABS resource utilization status in a $7^{th}$ bit of the IE. Example details of the ABS status IE can be found in Table 1. The primary ABS resource status may indicate a PRB utilization ratio for the highly interfered UE in the overlapped ABS allocation by two different aggressor cells. The secondary ABS resource status may represent the PRB utilization ratio for the highly interfered UE in the ABS resource allocated by one major aggressor cell rather than the other aggressor cell.

In one example embodiment, categorizing an ABS resource as primary ABS resource or secondary ABS resource at step 306 may mirror the similar operations by the victim eNB and may include categorizing each ABS resource as a primary or a secondary ABS resource. The macro eNB may categorize the ABS resource as a primary ABS resource if the ABS resource is common to all aggressor cells and categorize the ABS resource as a secondary ABS resource if the ABS resource is common to some, but not all of the aggressor cells. In one example embodiment, the macro eNB may create an overall view or map of all ABS resources and their utilization status, via integrating and combining all ABS resources utilization status information received from the victim eNB and the ABS resource allocations of the neighbor cells. The ABS resource allocations of the neighbor cells may be piggybacked on the report of the ABS utilization status from the victim base station.

In one example embodiment, determining an adjustment to the ABS resource allocation at step 308 may include determining the adjustment to the ABS resource allocation based on the received ABS resource utilization statuses, the categorized ABS resources, and the overall ABS resource allocation map for a CRE associated with the macro base station. The macro base station (an eNB) may increase the secondary ABS resource allocation if the primary ABS resources are exhausted, and if the ABS resource allocation map indicates that there is secondary ABS resource available. The macro eNB may decrease the secondary ABS resource allocation if the primary ABS resource is available and if the ABS resource allocation map indicates that there are primary ABS resources available.

In one example embodiment, determining the adjustment to the ABS resource allocation at step 308 may also include setting or adjusting a power level for ABS subframes according to a relative distance between the victim base station to the aggressor base station and a used CRE bias. In another example embodiment, determining the adjustment to the ABS resource allocation at step 308 may include adjusting the ABS resource allocation according to a variable TDD configuration for the victim base station located in an overlapped area of at least two different aggressor base stations.

In one example embodiment, determining a measurement set update at step 310 may include determining an update to an existing measurement set based on the received primary ABS resource utilization status, the secondary ABS resource utilization status and other relevant information. The update may indicate more frequent measurements of the primary ABS resources or secondary ABS resources if the ABS primary resource utilization status or the secondary ABS resource utilization status indicates a high utilization ratio.

In one example embodiment, sending to the victim eNB the measurement set update and the adjusted ABS resource allocation at step 312 may include sending to the victim eNB over inter-eNB interface the adjusted ABS resource allocation and the measurement set update. The adjusted ABS resource allocation and measurement set update may be carried in a same signaling message or separate messages and may use existing legacy signal protocol with little or no changes at all.

In one example embodiment, the above process of receiving utilization statuses of ABS resources from the victim eNB, categorizing the ABS resources, and determining an adjustment to the ABS resource allocation based on the received utilization status of ABS resources may be repeated or triggered periodically or by an event on a semi-static basis. The triggering events may include a utilization ratio of primary or secondary ABS resources crossing a predefined threshold.

In one example embodiment, the method 300 may be implemented at the macro base station 112 or macro base station 114 of FIG. 1. The method 300 is for illustration only and the steps of the method 300 may be combined, divided, or executed in a different order than illustrated, without departing from the scope of the invention of this example embodiment.

Figure 4:
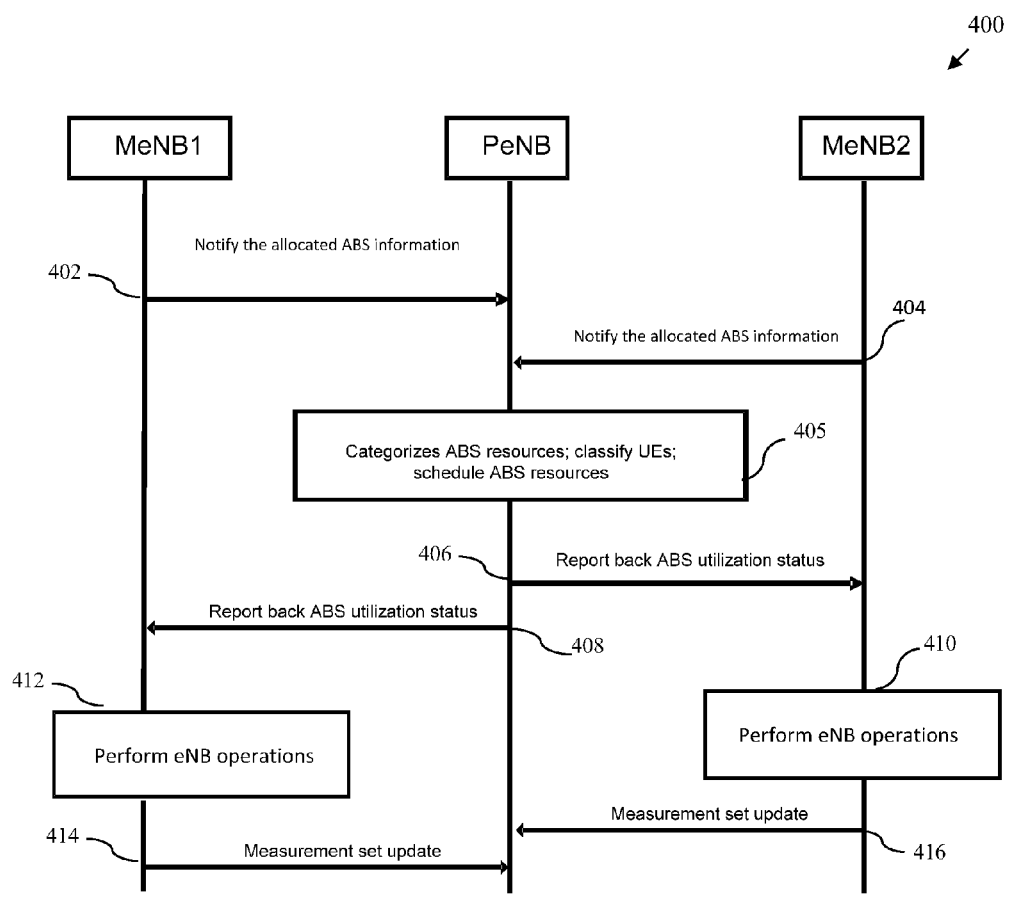
FIG. 4 illustrates an example message flow chart of signaling for managing protected resources in a heterogeneous network deployment in accordance with an example embodiment of the invention.

FIG. 4 illustrates an example message flow chart 400 for managing protected ABS resources in a heterogeneous network deployment in accordance with an example embodiment of the invention. There are three base stations involved in the example flow chart 400: a macro base station eNB1 (MeNB1), a macro base station eNB2 (MeNB2) and a pico base station eNB (PeNB). In one example embodiment, MeNB1 and MeNB2 are two main aggressor eNBs and may notify the PeNB of the ABS allocation information at step 402 and step 404 respectively. Notifying the victim base station PeNB the allocated ABS resource information at step 402 or 404 may take place at initial system startup or periodically as triggered by some events. After receiving the ABS allocation information from all aggressor eNBs, the PeNB may categorize ABS resources as primary ABS resource or secondary ABS resource, classifying the associated UEs and schedule ABS resource for the classified UE based on the categorized ABS resources at step 405. The victim base station PeNB may categorize the ABS resource into primary if the ABS resource is common to both MeNB1 and MeNB2 and as a secondary ABS resource if it is only used by either MeNB1 or MeNB2, but not both. The victim base station PeNB may then report its ABS utilization statuses back to MeNB1 and MeNB2 at steps 406 and 408 respectively. After receiving ABS utilization status, MeNB1 and MeNB2 perform eNB side operations at steps 412 and 410 respectively. The eNB side operations may include categorizing the ABS resources, determining an adjustment to the ABS resource allocation based on the received ABS resource utilization status information and determining a measurement set update. MeNB1 may determine an adjustment for the ABS resource visible to MeNB1 and similarly MeNB2 may determine an adjustment for ABS resources visible to MeNB2. MeNB1 and MeNB2 may also determine the measurement set update based on the ABS resource utilization status. Then MeNB1 and MeNB2 may send the determined ABS allocation adjustment and measurement set update to the victim base station PeNB at step 414 and step 416 respectively. The process of the flow chart 400 may start all over based on a semi-static schedule or as triggered by an event.

Figure 5:
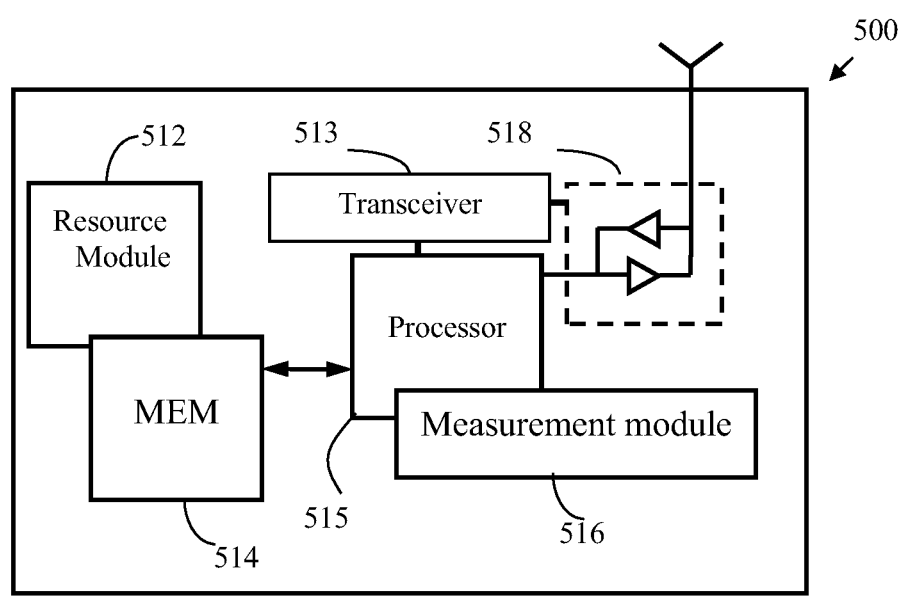
FIG. 5 illustrates an example wireless apparatus in accordance with an example embodiment of the invention.

FIG. 5 illustrates an example wireless apparatus in accordance with an example embodiment of the invention. In FIG. 5, the wireless apparatus 500 may include a processor 515, a memory 514 coupled to the processor 515, and a suitable transceiver 513 (having a transmitter (TX) and a receiver (RX)) coupled to the processor 515, coupled to an antenna unit 518 and a power management module 516. The memory 514 may store programs such as a resource scheduling module 512.

The processor 515 or some other form of generic central processing unit (CPU) or special-purpose processor such as digital signal processor (DSP), may operate to control the various components of the wireless apparatus 500 in accordance with embedded software or firmware stored in memory 514 or stored in memory contained within the processor 515 itself. In addition to the embedded software or firmware, the processor 515 may execute other applications or application modules stored in the memory 514 or made available via wireless network communications. The application software may comprise a compiled set of machine-readable instructions that configures the processor 515 to provide the desired functionality, or the application software may be high-level software instructions to be processed by an interpreter or compiler to indirectly configure the processor 515.

In an example embodiment, the resource module 512 may be configured to receive an ABS resource allocation from a macro eNB and categorize each ABS resource as a primary ABS resource or secondary ABS resource based on whether the ABS resource is shared by all aggressor macro eNBs or some of them within a coverage area, classify the associated UEs as a fully interfered UE or partially interfered UE and schedule the ABS resources based on the categorized ABS resources and classified UEs. Then the measurement module 516 may be configured to take measurements of the allocated ABS resource and in collaboration with the resource module 512, report back the ABS utilization status for the associated macro eNB to make an adjustment to the ABS resource allocation.

In one example embodiment, the transceiver 513 is for bidirectional wireless communications with another wireless device. The transceiver 513 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 513, portions of the antenna unit 518, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 518 may be provided to convert between wireless signals and electrical signals, enabling the wireless apparatus 500 to send and receive information from a cellular network or some other available wireless communications network or from a peer wireless device. In an embodiment, the antenna unit 518 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 518 may include antenna tuning and/or impedance matching components, RF power amplifiers, and/or low noise amplifiers.

In general, the various exemplary embodiments of the wireless apparatus 500 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 500 may be implemented in victim pico cell 116 of FIG. 1.

Without in any way limiting the scope, interpretation, or application of the claims appearing below, a technical effect of one or more of the example embodiments disclosed herein is to enhance the ABS resource and status feedback, which could be previously specified usable first priority ABS/status feedback and complementary second priority ABS/status feedback as well as the recommended ABS resource and to allow an eNB to adapt the allocated ABS pattern in a way to not only match other aggressor eNB patterns but also minimise resource wastage caused by unusable ABS resources. Another technical effect of one or more of the example embodiments disclosed herein is or a macro eNB to make a more informed decision on whether to adjust ABS resource allocation and which subframe should be allocated as the fully protected or low interference subframe, as well as reduce unnecessary frequent adjustment of protected resource for meeting the resource request.

Embodiments of the present invention may be implemented in software, hardware, application logic or a combination of software, hardware and application logic. The software, application logic and/or hardware may reside on a mobile station, an access point, a user equipment or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a mobile device, with one example of a mobile device described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for a victim base station to manage almost blank subframe (ABS) resources in a heterogeneous network deployment, the method comprising
   categorizing each of one or more protected ABS resources as one of a primary protected ABS resource and a secondary protected ABS resource, the one or more protected ABS resources being allocated by a target aggressor base station and one or more neighbor aggressor base stations;
   classifying each of one or more associated UEs as a fully interfered UE or a partially interfered UE; and
   scheduling the one or more ABS resources for the one or more associated UEs based on the categorized ABS resource and classified status of each associated UE.

2. The method of claim 1, further comprising sending to the target aggressor base station a utilization status for each primary protected ABS resource and a utilization status of each secondary protected ABS resource in a report message.

3. The method of claim 2, further comprising reporting to the target aggressor base station a recommended allocation of ABS resources of neighbor aggressor base stations in the report message.

4. The method of claim 2, wherein sending the utilization statuses to the target aggressor base station is triggered by one of:
   a utilization ratio of the primary ABS resource crosses a high threshold or a low threshold and
   a utilization ratio of the secondary ABS resource crosses a high threshold or a low threshold.

5. The method of claim 2, wherein sending to the target aggressor base station the utilization status of the primary protected ABS resource and the utilization status of the secondary protected ABS resources comprise at least one of
   including a 6 field in an ABS status information element (IE) of a status request message of an X2 application protocol to indicate the utilization status for the primary ABS resource; and
   including a $7^{th}$ field in the ABS status IE of the status request message to indicate the utilization status for each secondary ABS resource.

6. The method of claim 1, further comprising receiving allocations of the one or more protected ABS resource from each of the one or more neighbor aggressor base stations.

7. The method of claim 1, wherein categorizing each of the protected ABS resources as the primary ABS resource and the secondary ABS resource comprises
   categorizing the ABS resource as the primary ABS resource if the ABS resource is common to all of the target aggressor base station and the one or more neighbor aggressor base stations; and
   categorizing the ABS resource as the secondary ABS resource if the ABS resource is common to some, but not all of the target aggressor base station and the one or more neighbor aggressor base stations.

8. An apparatus for use in a victim base station to manage almost blank subframe (ABS) resources in a heterogeneous network deployment, the apparatus comprising a processing system configured to
   categorize each of one or more protected ABS resources as one of a primary protected ABS resource and a secondary protected ABS resource, the one or more protected ABS resources allocated by a target aggressor base station and one or more neighbor aggressor base stations;
   classify each of one or more associated UEs as a fully interfered UE or a partially interfered UE; and
   schedule the one or more ABS resources for the one or more associated UEs based on the categorized ABS resource and classified status of each associated UE.

9. The apparatus of claim 8, wherein the processing system is further configured to send to the target aggressor base station a utilization status for each primary protected ABS resource and a utilization status of each secondary protected ABS resource in a report message.

10. The apparatus of claim 9, wherein the processing system is further configured to report to the target aggressor base station a recommended allocation of ABS resources of neighbor aggressor base stations in the report message.

11. The apparatus of claim 9, wherein the processing system is configured to be triggered to send the utilization statuses to the target aggressor base station by one of following events:
    a utilization ratio of the primary ABS resource crosses a high threshold or a low threshold and
    a utilization ratio of the secondary ABS resource crosses a high threshold or a low threshold.

12. The apparatus of claim 9, wherein the processing system is configured to send to the target aggressor base station the utilization status of the primary protected ABS resource and the utilization status of the secondary protected ABS resources via at least one of
    including a $6^{th}$ field in an ABS status information element (IE) of a status request message of an X2 application protocol to indicate the primary ABS resource utilization status; and
    including a 7 field in the ABS status IE of the status request message to indicate the secondary ABS resource utilization status.

13. The apparatus of claim 8, wherein the processing system is configured to receive allocations of the one or more protected ABS resource from each of the one or more neighbor aggressor base stations.

14. An apparatus for use in an aggressor base station to manage almost blank subframe (ABS) resources in a heterogeneous network deployment, the apparatus comprising a processing system configured to
    receive utilization statuses of one or more protected ABS resources from a victim base station and a ABS resource allocation for each of one or more neighbor aggressor base stations;

categorize each of the one or more protected Almost Blank Subframe (ABS) resources as a primary protected ABS resource and a secondary protected ABS resource; and determine an adjustment to an allocation of the one or more protected ABS resources based on the received utilization statuses, the categorized primary ABS resource and the categorized secondary ABS resource and the received ABS resource allocation of each of the one or more neighbor aggressor base stations.

15. The apparatus of claim 14, wherein the processing system is configured to determine the adjustment via integrating the utilization statuses of the one or more protected ABS resource received from the victim base station and the ABS resource allocation from the one or more neighbor aggressor base stations to form an ABS resource allocation map for a cell range expansion (CRE) associated with the aggressor base station.

16. The apparatus of claim 15, wherein the processing system is configured to determine the adjustment via at least one of:

if the primary ABS resources are exhausted, increasing the secondary ABS resource allocation if the ABS resource allocation map indicates that there are secondary ABS resources available; and if the primary ABS resources are available, increasing the primary ABS resource allocation and decreasing the secondary ABS resource allocation.

17. The apparatus of claim 15, wherein the processing system is configured to determine the adjustment via setting each of the one or more protected ABS resource as a low interference subframe with a power level set according to a relative distance from the victim base station to the aggressor base station and a CRE bias associated with the aggressor base station.

18. The apparatus of claim 15, wherein the processing system is configured to perform at least one of:

updating a measurement set based on the utilization statuses of the one or more protected ABS resources and the ABS resource allocation map; and sending to the victim base station the updated measurement set.

19. The apparatus of claim 14, wherein the processing system is configured to determine the adjustment via adjusting the allocation of the one or more protected ABS resources according to a variable TDD configuration for the victim base station located in an overlapped area of at least two different aggressor base stations.

20. The apparatus of claim 14, wherein the processing system is configured to receive from the victim base station the utilization statuses of the one or more protected ABS resources via receiving the primary ABS resource utilization status in a $6^{th}$ field in an ABS status information element (IE) of a status request message and the secondary ABS resource utilization status in a $7^{th}$ field of the ABS status IE.

* * * * *